United States Patent [19]

Wolff et al.

[11] Patent Number: 5,184,779
[45] Date of Patent: Feb. 9, 1993

[54] METHOD OF PRODUCING GRANULATED MATERIAL COMPOSED OF ZINC OXIDE AND SILICA, RESULTING PRODUCT AND ITS USE

[75] Inventors: Siegfried Wolff, Bornheim-Merten; Karl Meier, Alfter, both of Fed. Rep. of Germany

[73] Assignee: Degussa Akiengesellscahft, Frankfurt am Main, Fed. Rep. of Germany

[21] Appl. No.: 756,201

[22] Filed: Sep. 10, 1991

[30] Foreign Application Priority Data

Sep. 14, 1990 [DE] Fed. Rep. of Germany ....... 4029158

[51] Int. Cl.$^5$ .............................................. B02C 23/08
[52] U.S. Cl. .......................................... 241/3; 241/24; 241/DIG. 31; 264/118
[58] Field of Search ................ 241/3, 24, DIG. 31; 264/118

[56] References Cited

U.S. PATENT DOCUMENTS

| | | | |
|---|---|---|---|
| 3,580,516 | 5/1971 | Spencer | 241/3 X |
| 3,787,221 | 1/1974 | Topcik | 106/491 |
| 4,049,588 | 9/1977 | Lee et al. | 241/DIG. 31 X |
| 4,211,578 | 7/1980 | Scott, IV | 106/475 |
| 4,381,949 | 5/1983 | Kuhner | 106/476 |
| 4,485,060 | 11/1984 | Franz et al. | 264/118 X |
| 4,934,609 | 6/1990 | Lindauer et al. | 241/3 |
| 4,954,060 | 9/1990 | Hsu | 264/118 X |

Primary Examiner—Frank T. Yost
Assistant Examiner—Kenneth E. Peterson
Attorney, Agent, or Firm—Beveridge, DeGrandi & Weilacher

[57] ABSTRACT

A granular material containing zinc oxide and precipitated silica which is readily dispersible in rubber mixtures.

14 Claims, 1 Drawing Sheet

METHOD OF PRODUCING GRANULATED MATERIAL COMPOSED OF ZINC OXIDE AND SILICA, RESULTING PRODUCT AND ITS USE

INTRODUCTION AND BACKGROUND

The present invention relates to readily dispersible granulated material composed of zinc oxide and precipitated silica, a method of its production and its use.

Given the growing awareness of society of the problems relating to the environment and the increasing demand for safe conditions in the work place, the rubber industry, just as other industries, is falling back on the use of starting materials which are dust-free or only very slightly dusty. The requirements placed on the manufacturer of raw products for being able to offer them in a low-dust form are becoming more and more stringent. Another concern of the rubber-processing industry relates to the use of raw materials which can be readily transported and stored in silos. Such raw materials clearly simplify handling since the raw materials can be automatically supplied as silo material with the appropriate transport capabilities for delivery to the mixing units used in the rubber industry. Powdery raw materials can not be readily transported as a rule since the conveying systems become clogged. One solution generally offered is to provide the raw materials in granulated form. However, the good handling properties which can be achieved by granulation are frequently offset by the poor dispersing behavior of this granulated material when compounded with rubber. This poor dispersing behavior is automatically associated with unfavorable mechanical properties (tensile strength, elongation at rupture, tear resistance, etc.) of the finished rubber article.

Zinc oxide belongs to the large groups of compounds frequently used in the rubber industry. Although it can be granulated according to customary methods, it is apparent that the granulated zinc oxide material obtained in this manner can not be dispersed to a satisfactory degree in the rubber mixture. This failing is due to the hardness of the zinc oxide. Another possibility of converting zinc oxide into a low-dust form is presented by the process of pelletizing, whereby zinc oxide is agitated in appropriately equipped rotating drums which brings about a compaction or densification to form spherical pellets of zinc oxide. However, the pellets produced in this manner are very soft and disintegrate readily. Therefore, storage in a silo, and especially pneumatic transport systems for conveying the product, is not possible The dust content is also very high, so that the goal of a low-dust product is achieved only to an insufficient extent. Therefore, even this form of use was not able to find general acceptance in the rubber industry.

SUMMARY OF THE INVENTION

An object of the invention is to provide a method of making zinc oxide in granular form which is distinguished by giving off very little dust and by a good dispersing behavior in rubber mixtures.

In accordance with a feature of the present invention, there is provided a granulated material consisting essentially of zinc oxide and precipitated silica with a content of 5 to 95% by weight zinc oxide and 95 to 5% by weight precipitated silica, especially 50% by weight each, with a particle size between about 0.003 mm and 12 mm, especially where at least 80% of the particles are 0.5 to 5 mm and with a bulk weight of 350 to 1250 g/l, especially of 500 to 600 g/l. This composition has been found to meet the desired requirements discussed above. The precipitated silicas used exhibit a specific surface of 1 to 1000 m$^2$/g (determined according to BET with nitrogen as set forth in DIN (German Industrial Standard) 66131). These are silicas which are in general use in the rubber art.

Another feature of the invention resides in a method which is carried out both continuously as well as discontinuously for producing the readily dispersible granulated material formed of zinc oxide and precipitated silica. This method is characterized in that homogeneous mixtures of 5 to 95% by weight zinc oxide and 95 to 5% by weight precipitated silica are transported by conveying means (e.g., conveyor worms) to rolling pressure means (e.g., two press rollers whose shafts are attached above one another in a parallel and vertical manner and whose contact pressure can be varied). The powders are compacted there, then with the aid of a cake breaker the material is granulated to obtain the desired maximum particle size. The remaining dust-like component is separated out. The separated dust is recycled back into the granulation operation. The yield is approximately 60%.

The contact pressure of the rollers, whose surface can be smooth or structured, is adjusted to 12 to 40 bars, especially to 12 to 25 bars. A suitable granulating press is described in DE-OS 17 78 089. The cake breakers and sifters (zigzag sifters) or sifter cascades suitable for separating the dusty component are likewise generally known devices.

There are also many mixers available for the continuous as well as for the discontinuous production of the mixture.

In an advantageous embodiment the mixture is conveyed with the aid of a conveyor worm evacuated to 0.01 to 0.7 bars, especially 0.2 to 0.4 bars, to the press rollers. The granulated material produced from zinc oxide and silica in accordance with the invention is distinguished from pure zinc oxide by the following properties:

1) It is practically dust-free, that is, a maximum of 6% by weight of the granulated material exhibits a particle size of less than 0.074 mm (200 mesh);

2) It can be stored in silos and conveyed;

3) It exhibits good dispersing behavior in the rubber mixtures to be vulcanized; and 4) It results in better tear resistance values from a rubber technology standpoint.

DETAILED DESCRIPTION OF THE INVENTION

Figure 1:
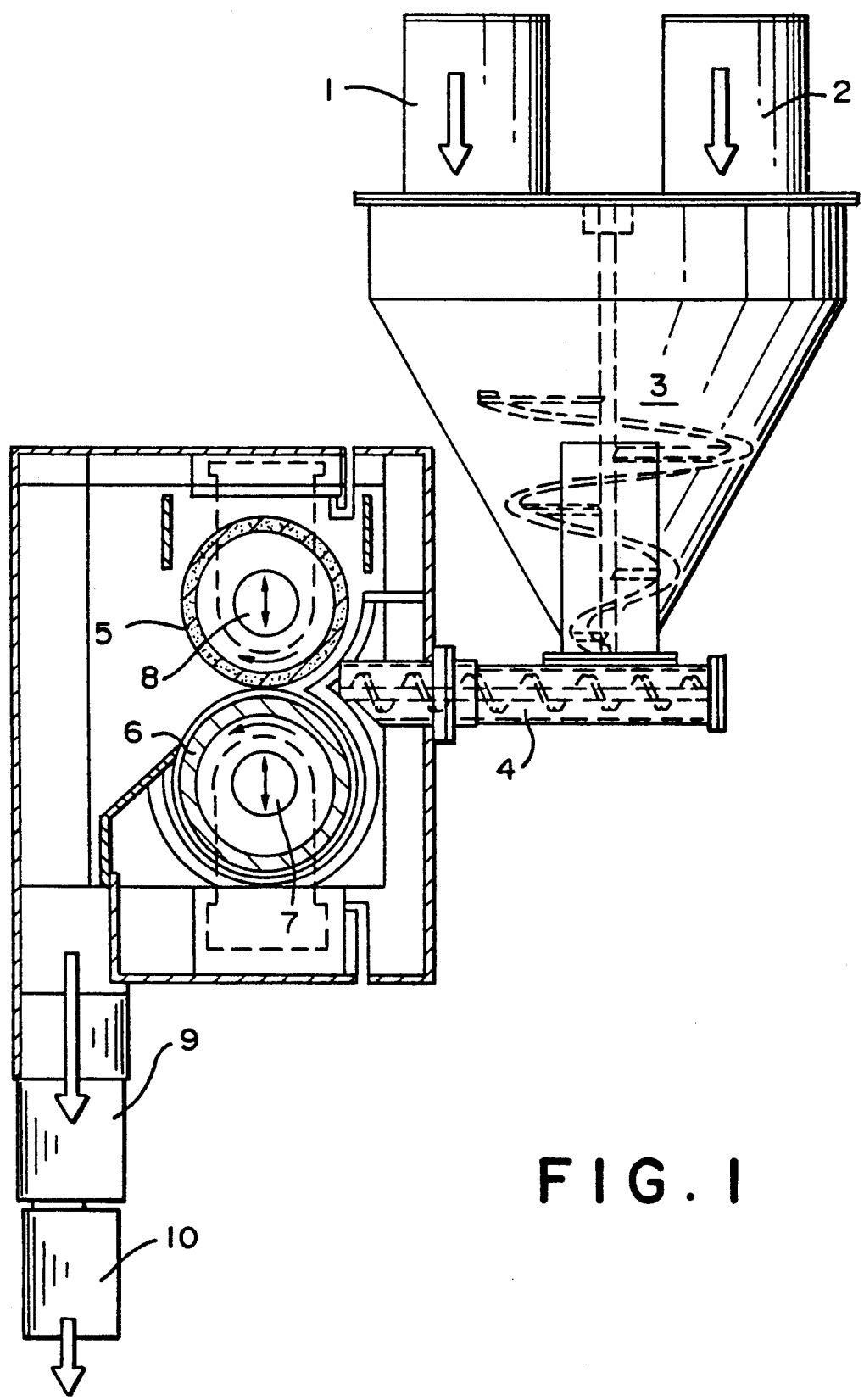

FIGURE 1 illustrates a device used in the manufacture of the granulated material of the present invention. Zinc oxide and silia are introduced through feeding openings (1) and (2) into mixer (3) and are transported by conveyor worm (4) to press rollers (5) and (6) in which shafts (7) and (8) are assembled in a vertical and parallel manner above each other. The resulting granules fall into cake breaker (9) whereby the dust-like component is separated (10).

DETAILED DESCRIPTION OF THE INVENTION

The granulated material of the invention is added to the rubber mixture, in the conventional manner known in the rubber industry, in amounts of 0.5 to 25 parts per 100 parts rubber but preferably in amounts of 1 to 10 parts per 100 parts rubber. These amounts are selected based upon the generally used zinc oxide concentration if a granulated material composed of 1:1 is used.

The silica charged in the form of this granulated material described herein into a rubber product, such as into rubber mixtures containing only carbon black as filler, has no negative effect on the rubber technology properties. The amount thereof can be determined by conventional methods during the establishing of the total filler content. This is particularly the case if a silica-filled rubber mixture is involved. A granulated material produced under rather high contact pressures (25 bars) and optionally without preventilation in the conveyor worm is preferably used in "rather hard" rubber mixtures (e.g. natural rubber). Due to the rather high shear forces used here, these granulated materials are then also sufficiently dispersible.

Suitable rubber types include rubbers which can be cross-linked with sulfur and vulcanization accelerators to form elastomers. Mixtures thereof are also included These are in particular the halogen-free rubber types, preferably so-called diene elastomers. These rubber types include, for example, oil-extended natural and synthetic rubbers such as natural rubbers, butadiene rubbers, isoprene rubbers, butadiene styrene rubbers, butadiene acrylonitrile rubbers, butyl rubbers, ter polymers of ethylene, propylene and non-conjugated dienes. Furthermore, the following additional rubbers are contemplated for rubber mixtures with the mentioned rubbers: Carboxyl rubbers, epoxide rubbers, transpolypentenamer, halogenated butyl rubbers, rubbers of 2-chlorobutadiene, ethylene vinyl acetate copolymers, ethylene propyl copolymers, optionally also chemical derivatives of natural rubber as well as modified natural rubbers.

In addition, the rubber mixtures provided with the zinc oxide/silica granulated material of the invention can contain other components conventionally used in the rubber industry such as e.g. customary reinforcing systems, that is, furnace blacks, channel blacks, lampblacks, thermal blacks, acetylene blacks, arc blacks, CK blacks, etc. as well as synthetic fillers such as silicas, silicates, aluminum oxide hydrates, calcium carbonates and natural fillers such as clays, siliceous chalks, chalks, talcums, etc. as well as silane-modified fillers.

The following components may also be utilized:

Customary vulcanization accelerators used in the rubber industry (e.g., sulfenamides, mercaptobenzothiazols, mercaptobenzothiazyl disulfides, triazine accelerators, thiurames), alone or in a mixture in amounts of 0.1 to 10% parts by weight relative to 100 parts by weight rubber.

Retarders (e.g., Vulkalent E (N-trichloromethylthiophenylsulfonyl)-benzene, PVI (N-(cyclohexylthio)phthalimide), likewise in amounts of 0.1 to 10 parts by weight relative to 100 parts by weight rubber.

Stearic acid as a vulcanization promotor in amounts of 0.5 to 10% by weight relative to 100 parts rubber.

Anti-ageing agents, anti-ozonants and anti-fatigue agents used in the rubber industry such as IPPD (N-isopropyl-N-phenyl-p-phenylene diamine), TMQ (2,2,4-trimethyl-1,2-dihydroquinoline), as well as also waxes as light stabilizers and their blends.

Optionally silanes such as e.g. bis-(3-triethexysilylpropyl)tetrasulfane, gamma-chloropropyltriethoxysilane, gamma-mercaptopropyltrimethoxysilane, vinyltrialkoxysilanes and their blends in an amount of 0.1 to 20 parts by weight, preferably 1 to 10 parts by weight, per each 100 parts by weight filler.

Optionally sulfur in an amount of 0.1 to 10 parts by weight per each 100 parts by weight rubber.

Optionally colorants and auxiliary processing agents in the customary dosage.

The production of the mixture takes place in the manner known in the rubber industry in a closed mixer or on an open roll mill.

The area of application of the granulated material of the invention extends to rubber mixtures like those customarily used in tires, industrial articles of all types (e.g. conveyor belts, rollers, seals, hoses, V-belts, etc.) and shoe soles.

The present invention also concerns a method of using a readily dispersible granulate material containing zinc oxide and precipitated silica with a content of 5 to 95% by weight zinc oxide and 95 to 5% by weight of precipitated silica. The method involves admixing the dispersible granulate material into a natural or synthetic rubber using conventional methods known in the art.

| Test standards for use: | Test method | Unit |
|---|---|---|
| $D_{max}-D_{min}$ tensile stress | DIN 53 529 | Nm |
| 100% 200% 300% | DIN 53 504 | MPa |
| Tear resistance | DIN 53 507 | N/mm |
| $t_{10}\%$ | | min |
| $t_{80}\%-t_{20}\%$ | | min |
| $t_{90}\%-t_{10}\%$ | | min |
| Bulk density | DIN 150787/11 | g/l |

The following names and abbreviations whose meaning is cited here are used in the examples of use:

| | |
|---|---|
| RSS 1 | ribbed smoked sheet (natural rubber) |
| CORAX ® | carbon black, surface (BET: 115 m$^2$/g (Degusa) |
| Naftolen ® ZD | aromatic softener |
| Vulkanox ® HS | 2,2,4-trimethyl-1,2-dihydroquinoline (Bayer) |
| Vulkacit ® CZ | benzothiazyl-2-cyclohexylsulfenamide |
| Protector ® G35 | antiozone wax |
| Vulkanox ® 4010 NA | N-isopropyl-N'-phenyl-p-phenylene diamine |
| KP 140 | paraffinic softener |
| Butyl 301 | butyl rubber |
| Iron oxide batch | mixture of butyl rubber and iron oxide |
| Sipernat ® 22 | spray-dried silica (BET: 190 m$^2$/g) |

EXAMPLE 1

Continuous Production of the Mixed Product Zinc Oxide/Silica 100 kg/hour Sipernat 22 and 100 kg zinc oxide/hour pass in a gravimetrically controlled manner into a Gericke mixer. The two components are homogenized via built-in mixing spirals rotating at a speed of 120 rpms. After a dwell time of 40 sec., the mixed material leaves the mixer via a hollow worm and is supplied to the granulation.

EXAMPLE 2

Discontinuous Production of the Mixed Product Zinc Oxide/Silica 150 kg silica and 150 kg zinc oxide are charged into a truncated-cone mixer of the Alpine company provided with a spiral tube and then mixed for 30 min. After the passage of the homogenizing time the finished mixed material is removed from the mixer and supplied to the granulation.

EXAMPLE 3

Granulation of Zinc Oxide/Sipernat 22

100 kg zinc oxide/Sipernat 22 (ratio 1:1) are dosed with an evacuatable (vacuum 0.6 bar) double worm into the slot between the rollers running in opposite directions. The roller pressure is adjusted to 17 bars. After leaving the roller slot, the comminution of the scabs takes place to a granular size of 5 mm by means of a two-stage breaker. The broken granulated material is deducted with a zigzag sifter by blowing in air. The yield is 58%. The dust is returned pneumatically into the compacting process. (see table 1 for the particle size distribution).

EXMPLE 4

The Use of Zinc Oxide/Sipernat 22 Granulated Material in a Truck Tread Recipe based on NR

|  | 1 | 2 | 3 | 4 | 5 | 6 | 7 |
|---|---|---|---|---|---|---|---|
| RSS 1 ML (1 + 4) = 70–80 | 100 | 100 | 100 | 100 | 100 | 100 | 100 |
| Corax N 220 | 50 | 50 | 50 | 50 | 50 | 50 | 50 |
| ZnO R | 4 | — | — | — | — | — | — |
| Sipernat 22 | 4 | — | — | — | — | — | — |
| ZnO/Sipernat 22 |  |  |  |  |  |  |  |
| 17 bars/0 vacuum | — | 8 | — | — | — | — | — |
| 17 bars/0.4 vacuum | — | — | 8 | — | — | — | — |
| 17 bars/0.6 vacuum | — | — | — | 8 | — | — | — |
| 20 bars/0 vacuum | — | — | — | — | 8 | — | — |
| 20 bars/0.4 vacuum | — | — | — | — | — | 8 | — |
| 20 bars/0.6 vacuum | — | — | — | — | — | — | 8 |
| Stearic acid | 2 | 2 | 2 | 2 | 2 | 2 | 2 |
| Naftolen ZD | 3 | 3 | 3 | 3 | 3 | 3 | 3 |
| Protector G 35 | 1 | 1 | 1 | 1 | 1 | 1 | 1 |
| Vulkanox 4010 NA | 2.5 | 2.5 | 2.5 | 2.5 | 2.5 | 2.5 | 2.5 |
| Vulkanox HS | 1.5 | 1.5 | 1.5 | 1.5 | 1.5 | 1.5 | 1.5 |
| Vulkacit CZ | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 |

|  | 8 | 9 | 10 |
|---|---|---|---|
| RSS 1 ML (1 + 4) = 70–80 | 100 | 100 | 100 |
| CORAX N 220 | 50 | 50 | 50 |
| ZnO/Sioernat 22 |  |  |  |
| 25 bars/0.4 vacuum | 8 | — | — |
| 25 bars/0.6 vacuum | — | 8 | — |
| 30 bars/0.6 vacuum | — | — | 8 |
| Stearic acid | 2 | 2 | 2 |
| Naftolen ZD | 3 | 3 | 3 |
| Protector G 35 | 1 | 1 | 1 |
| Vulkanox 4010 NA | 2.5 | 2.5 | 2.5 |
| Vulkanox HS | 1.5 | 1.5 | 1.5 |
| Vulkacit CZ | 1.5 | 1.5 | 1.5 |
| Sulfur | 1.5 | 1.5 | 1.5 |

Rheometer test (Monsanto, Type: MPV)
Deformation amplitude: 3 degrees, test frequency: 3 cycles/min., running time: 3 h, test temperature: 150° C.

|  | 1 | 2 | 3 | 4 | 5 | 6 | 7 |
|---|---|---|---|---|---|---|---|
| $D_{max}-D_{min}$ (Nm) | 9.48 | 9.16 | 8.97 | 8.92 | 8.80 | 8.88 | 8.82 |
| $t_{10\%}$ (min) | 7.6 | 7.9 | 8.0 | 8.2 | 8.2 | 8.2 | 8.3 |
| $t_{80\%}-t_{20\%}$ (min) | 1.7 | 1.8 | 1.8 | 1.8 | 1.9 | 1.8 | 1.9 |
| $t_{90\%}-t_{10\%}$ (min) | 3.2 | 3.4 | 3.3 | 3.4 | 3.5 | 3.4 | 3.5 |

|  | 8 | 9 | 10 |
|---|---|---|---|
| $D_{max}-D_{min}$ (Nm) | 9.14 | 8.92 | 9.00 |
| $t_{10\%}$ (min) | 8.1 | 8.2 | 8.4 |
| $t_{80\%}-t_{20\%}$ (min) | 1.9 | 1.8 | 1.8 |
| $t_{90\%}-t_{20\%}$ (min) | 3.5 | 3.4 | 3.3 |

Non-aged
Vulcanization temperature: 150° C.

|  | 1 | 2 | 3 | 4 | 5 | 6 | 7 |
|---|---|---|---|---|---|---|---|
| Tensile stress 100% (MPa) | 2.2 | 2.2 | 2.2 | 2.2 | 2.1 | 2.1 | 2.2 |
|  | 5.7 | 5.9 | 5.9 | 6.0 | 5.8 | 5.8 | 5.9 |
| Tensile stress 200% (MPa) | 10.9 | 11.1 | 11.1 | 11.0 | 10.9 | 11.1 | 11.3 |
| Tensile stress 300% (MPa) |  |  |  |  |  |  |  |
| Tear resistance DIN 53 507 (N/mm) | 26 | 31 | 33 | 35 | 35 | 32 | 34 |

|  | 8 | 9 | 10 |
|---|---|---|---|
| Tensile stress | 2.3 | 2.2 | 2.3 |

| | | | |
|---|---|---|---|
| 100% (MPa) | | | |
| Tensile stress | 6.1 | 6.0 | 6.2 |
| 200% (MPa) | | | |
| Tensile stress | 11.4 | 11.2 | 11.5 |
| 300% (MPa) | | | |
| Tear resistance | | | |
| DIN 53 507 | 33 | 34 | 38 |
| (N/mm) | | | |

The example shows that the tear resistances can be distinctly increased by mixing zinc oxide with Sipernat 22 and by a subsequent granulation with rubber technology physical values which is otherwise almost the same.

EXAMPLE 5

Investigation of the Dispersing Behavior of Zinc Oxide/Sipernat 22 Granulated Material with the Butyl Test

| | 1 | 2 | 3 | 4-8 |
|---|---|---|---|---|
| Butyl 301 | 92.5 | 92.5 | 92.5 | 92.5 |
| Iron oxide batch | 15 | 15 | 15 | 15 |
| KP 140 | 5.2 | 5.2 | 5.2 | 5.2 |
| ZnO RS | 8.5 | — | 8.2 | — |
| Sipernat | — | 8.5 | 8.5 | — |
| ZnO/Sipernat 22 GR* | — | — | — | 17 |

*produced under the conditions cited in example 4

Butyl Test

The zinc oxide/Sipernat 22 granulated material to be investigated as to its dispersing behavior is worked into a very soft butyl rubber mixture dyed red with iron oxide. On account of the red color, any white specks present, which are due to a deficient dispersal of the substances to be tested, can be readily recognized optically. In addition, the first cut of this mixture drawn out to a 6 mm rough sheet is tested for sheen. High sheen signifies a good dispersal but dull signifies a poor dispersal.

| | Speck | First cut |
|---|---|---|
| ZnO powder | without visible specks | high sheen |
| Sipernat 22 | low number of small specks | high sheen |
| ZnO/Sip. 22 powder | low number of small specks | high sheen |
| ZnO/Sip. vacuum: 0 pressure: 17 bars | fairly large number of small specks | silky sheen |
| ZnO/Sip. 22 vacuum: 0.6 pressure: 17 bars | practically no specks | high sheen |
| ZnO/Sip. 22 vacuum: 0.4 pressure: 20 bars | low number of small and average specks | silky sheen |
| ZnO/Sip. 22 vacuum: 0.4 pressure: 25 bars | low number of small and average specks | dull sheen |
| ZnO/Sip. 22 | cut surface with | dull sheen |
| ZnO/Sip. 22 vacuum: 0.6 pressure: 30 bars | small and average specks | |

Result

The example shows that the conditions for the production of the granulated material must be precisely worked out and maintained. Otherwise, non-acceptable limitations in the dispersing behavior will result. In the present example the optimum conditions are at a pressure of 17 bars and an applied pressure of 0.6 bar.

EXAMPLE 6

Evaluation of the Dispersal of the Zinc Oxide/Sipernat 22 Granular Material by Means of the Shell Test

Method

The mixtures cited in example 5 and provided with the zinc oxide/Sipernat 22 granulated material produced under various conditions are pressed through a strainer sieve by an extruder. Any hard non-dispersed particles present are retained on the sieve. Then the sieve, which may be charged with residue, is pressed between two aluminum foils. If any non-dispersed hard particles are present, a scratch pattern is produced on the foil. The number and the depth of the scratches allow conclusions to be drawn about the dispersal of the material tested.

The zinc oxide/Sipernat 22 patterns tested yielded the following picture:

| | |
|---|---|
| ZnO powder | no scratches, best picture |
| Sipernat 22 | very low number of flat scratches |
| ZnO/Sip. 22 powder | very low number of flat scratches better than pure Sipernat 22 |
| ZnO/Sip. 22 vacuum: 0 pressure: 17 bars | almost no scratches |
| ZnO/Sip. 22 vacuum: 0.6 pressure: 17 bars | almost no scratches |
| ZnO/Sip. 22 vacuum: 0.4 pressure: 20 bars | almost no scratches |
| ZnO/Sip. 22 vacuum: 0.4 pressure: 25 bars | flat scratches |
| ZnO/Sip. 22 vacuum: 0.6 pressure: 30 bars | flat but long scratches, best picture at 30 bars |

TABLE 1

| | Grain Size Distribution of material broken at 5 mm (Sipernat/ZnO 1:1) (% by weight) | | | | | | | | |
|---|---|---|---|---|---|---|---|---|---|
| | Specimen No. | | | | | | | | |
| | 2 | 3 | 4 | 5 | 6 | 7 | 8 | 9 | 10 |
| | Pressure | | | | | | | | |
| | 17 | 17 | 17 | 20 | 20 | 20 | 25 | 25 | 30 |
| | | | | | bars | | | | |
| mm | — | 0.4 | 0.6 | — | 0.4 | 0.6 | 0.4 | 0.6 | 0.6 |
| >5 mm | 0 | 0 | 0 | 0 | 0 | 0 | 0 | 0 | 0 |
| 3.15–5 | 3.3 | 3.5 | 3.6 | 4.0 | 4.7 | 4.3 | 4.0 | 5.3 | 4.4 |
| 2.5–3.15 | 6.9 | 7.9 | 7.9 | 8.9 | 9.9 | 8.3 | 8.7 | 10.2 | 9.5 |
| 1.4–2.5 | 34.2 | 35.1 | 35.7 | 37.6 | 4.4 | 36.7 | 36.6 | 38.6 | 38.4 |
| 1–1.4 | 18.0 | 17.3 | 16.9 | 18.4 | 16.1 | 16.8 | 17.4 | 16.2 | 17.5 |
| 0.5–1.0 | 21.1 | 21.0 | 19.4 | 20.9 | 16.6 | 19.8 | 21.0 | 18.9 | 20.2 |
| 0.5–0.074 | 10.46 | 10.11 | 10.31 | 6.51 | 6.39 | 9.43 | 8.19 | 7.61 | 7.13 |
| <200 mesh | 5.85 | 4.99 | 5.74 | 3.64 | 4.03 | 4.43 | 3.76 | 3.35 | 3.13 |
| Bulk density (g/l) | 526 | 515 | 521 | 549. | 549 | 549 | 556 | 562 | 568 |

Further variations and modifications of the invention will become apparent to those skilled in the art from the foregoing and are intended to be encompassed by the claims appended hereto.

German Priority Application P 40 29 158.8, filed on Sep. 14, 1990, is relied on incorporated by reference.

What is claimed is:

1. A method for the production of readily dispersible granulated material of zinc oxide and precipitated silica, comprising forming a homogeneous mixture of 5 to 95% by weight zinc oxide and 95 to 5% by weight precipitated silica, transporting said mixture by conveying means to rolling pressure means, compacting said mixture, then subjecting the resulting compacted mixture to a cake breaker to form granulated material of a desired maximum particle size and a remaining dustlike component, and separating said granulated material of a desired maximum particle size from said dustlike component.

2. The method according to claim 1, wherein the contact pressure of said rolling pressure means amounts to 12 to 40 bars.

3. The method according to claim 2, wherein the contact pressure of said rolling pressure means amounts to 12 to 25 bars.

4. The method according to claim 1, wherein said mixture is transported to said rolling pressure means with the aid of a conveyor worm evacuated to 0.01 to 0.7 bar.

5. The method according to claim 4, wherein said mixture is transported to said rolling pressure means with the aid of a conveyor worm evacuated to 0.2 to 0.4 bar.

6. The method according to claim 1, wherein said conveying means are conveyor worms.

7. The method according to claim 1, wherein said rolling pressure means are two press rollers whose shafts are attached above one another in a parallel and vertical manner and whose contact pressure can be varied.

8. The method according to claim 1, wherein said homogeneous mixture is formed from 50% by weight zinc oxide and 50% by weight precipitated silica.

9. The method according to claim 1, wherein said granulated material has a particle size of about 0.003 mm to 12 mm.

10. The method according to claim 9, wherein at least 80% of said granulated material has a particle size of 0.5 to 5 mm.

11. The method according to claim 1, wherein a maximum of 6% by weight of said granulated material exhibits a particle size of less than 0.074 mm.

12. The method according to claim 1, wherein said granulated material has a bulk weight of 350 to 1250 g/l.

13. The method according to claim 12, wherein said granulated material has a bulk weight of 500 to 600 g/l.

14. The method according to claim 1, wherein said precipitated silica has a specific surface of 1 to 1000 $m^2/g$.

* * * * *

UNITED STATES PATENT AND TRADEMARK OFFICE
CERTIFICATE OF CORRECTION

PATENT NO. : 5,184,779
DATED : February 9, 1993
INVENTOR(S) : Siegfried Wolff et al.

It is certified that error appears in the above-identified patent and that said Letters Patent is hereby corrected as shown below:

On the title page:

In Item [75], please add --Udo Goerl, Meckenheim-- after "Bornheim-Merten;" and replace "both" with --all--; and In Item [73], please replace "Akiengesellscahft" with --Aktiengesellschaft--.

Signed and Sealed this

Twenty-third Day of November, 1993

Attest:

BRUCE LEHMAN

Attesting Officer     Commissioner of Patents and Trademarks